United States Patent
Cho et al.

(10) Patent No.: US 8,139,556 B2
(45) Date of Patent: Mar. 20, 2012

(54) METHOD AND APPARATUS FOR TRANSMITTING AND RECEIVING DOWNLINK SYNCHRONIZATION CHANNEL IN A CELLULAR COMMUNICATION SYSTEM

(75) Inventors: Joon-Young Cho, Suwon-si (KR); Ju-Ho Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1086 days.

(21) Appl. No.: 12/022,589

(22) Filed: Jan. 30, 2008

(65) Prior Publication Data
US 2008/0181195 A1 Jul. 31, 2008

(30) Foreign Application Priority Data
Jan. 30, 2007 (KR) .................. 10-2007-0009603

(51) Int. Cl.
*H04J 3/06* (2006.01)
(52) U.S. Cl. ........ 370/350; 370/329; 370/335; 370/341; 370/342
(58) Field of Classification Search .................. 370/328, 370/329, 335, 341, 350, 503
See application file for complete search history.

(56) References Cited

U.S. PATENT DOCUMENTS

| 7,065,064 | B2 | 6/2006 | Chitrapu | |
| 2001/0034254 | A1* | 10/2001 | Ranta | 455/574 |
| 2002/0041580 | A1* | 4/2002 | Shoji et al. | 370/335 |
| 2002/0068547 | A1* | 6/2002 | Kim et al. | 455/410 |
| 2003/0095516 | A1 | 5/2003 | Ok et al. | |
| 2003/0202541 | A1* | 10/2003 | Lim et al. | 370/503 |
| 2004/0161020 | A1 | 8/2004 | Mathew et al. | |
| 2005/0099972 | A1* | 5/2005 | Motegi et al. | 370/328 |

* cited by examiner

*Primary Examiner* — Hassan Kizou
*Assistant Examiner* — Toan Nguyen
(74) *Attorney, Agent, or Firm* — The Farrell Law Firm, P.C.

(57) ABSTRACT

A method and apparatus for transmitting and receiving an SCH in a cellular wireless communication system, in which a number of available PSCs among PSCs defined for P-SCH in the system is checked, a default PSC to be used with priority in UEs of the system for cell search is selected and a P-SCH signal is transmitted with the default PSC in each of underlying cells when the number of available PSCs is 1, and PSCs are selected for the cells from among the available PSCs so adjacent cells have different PSCs and P-SCH signals are transmitted using the selected PSCs in the cells when the number of available PSCs is 2 or larger.

22 Claims, 11 Drawing Sheets

METHOD AND APPARATUS FOR TRANSMITTING AND RECEIVING DOWNLINK SYNCHRONIZATION CHANNEL IN A CELLULAR COMMUNICATION SYSTEM

PRIORITY

This application claims priority under 35 U.S.C. §119(a) to a Korean Patent Application filed in the Korean Intellectual Property Office on Jan. 30, 2007 and assigned Serial No. 2007-9603, the disclosure of which is hereby incorporated by reference.

BACKGROUND OF THE INVENTION

1. Field of the Invention

The present invention generally relates to a cellular wireless communication system. More particularly, the present invention relates to a method and apparatus for transmitting and receiving a downlink Synchronization CHannel (SCH).

2. Description of the Related Art

In a cellular wireless communication system, synchronization and cell search should precede between a transmitter and a receiver, for demodulation of received data and control information. Downlink synchronization and cell search are the process in which a User Equipment (UE) detects the start of a frame transmitted on a physical channel in a cell and identifies a cell-specific scrambling code applied to the physical channel. This process is referred to below as a cell search, in short. The UE performs a cell search by detecting a downlink SCH code.

FIG. 1 illustrates a known Orthogonal Frequency Division Multiplexing (OFDM) downlink frame structure and OFDM downlink SCH transmission timings in Evolved Universal Terrestrial Radio Access (EUTRA) that is the next-generation mobile communication standard of $3^{rd}$ Generation Partnership Project (3GPP).

Referring to FIG. 1, a 10-ms radio frame 100 includes 10 subframes 106 each having two slots 101. In general, one slot carries 7 OFDM symbols 105. A Primary SCH (P-SCH) 103 and a Secondary SCH (S-SCH) 104 are transmitted in a particular slot 101 or 102 of each subframe 106 on the downlink.

In the EUTRA system, a UE acquires slot timing synchronization from a P-SCH in the first step of cell search by correlating a received signal with a P-SCH Scrambling Code (PSC) applied to the P-SCH and detecting a timing having a correlation peak.

In the second step of the cell search, from an S-SCH, the UE acquires frame timing synchronization and identifies a cell code group including a scrambling code specific to a cell. The second step is performed by detecting an S-SCH Scrambling Code (SSC). As illustrated in FIG. 1, the P-SCH 104 and the S-SCH 103 are transmitted in successive OFDM symbols of a slot. Hence, the UE eliminates the effect of a channel on a received S-SCH signal using the P-SCH detected in the first step as a channel estimation pilot for S-SCH detection and then carries out coherent detection for detecting the cell code group, thereby improving the performance of the S-SCH detection.

In the last step of the cell search, the UE detects a cell-specific code (i.e. cell-specific scrambling code) with a correlation peak by correlating a received pilot channel signal (or reference signal) with every cell-specific code within the cell code group. For example, one cell code group includes three codes in the EUTRA standard. A major asynchronous system, Wideband Code Division Multiple Access (WCDMA) performs a cell search procedure in a similar fashion.

By acquiring frame timing synchronization to a current cell and detecting the scrambling code specific to the current cell, the UE can demodulate data and control channels. The UE then can detect the cell IDentifier (ID) of the cell through demodulation of a Broadcasting CHannel (BCH).

The EUTRA standard defines three PSCs available to cells. One of the three PSCs is selected for application to a P-SCH for each cell for the reason that will be described with reference to FIG. 2. In FIG. 2, on the assumption of a synchronous network where frame transmission timing is synchronized among cells 200, 201 and 202 (cell #11, cell #23, and cell #32), P-SCHs and S-SCHs are transmitted at the same timing in cell #11, cell #23, and cell #32.

Referring to FIG. 2, Node Bs 207, 208 and 209 (Node B #1, Node B #2 and Node B #3) each manage three cells. Specifically, Node B #1 manages $11^{th}$, $12^{th}$ and $13^{th}$ cells 200, 203, and 204 (cell #11, cell #12 and cell #13), Node B #2 manages $21^{th}$, $22^{th}$ and $23^{th}$ cells 201 (cell #21, cell #22 and cell #23), and Node B #3 manages $31^{th}$, $32^{th}$ and $33^{th}$ cells 202 (cell #31, cell #32 and cell #33). A first UE 205 (UE #1) is located at the boundary among cells #11, #23 and #32, and a second UE 206 (UE #2) is located at the center of cell #23. If all cells use the same PSC, cell #11, cell #23 and cell #32 transmit PSCs 210, 212 and 214 that are identical. Cell #11, cell #23 and cell #32 use SSCs 211, 213 and 215, respectively (SSC #k, SSC #n, and SSC #m) for S-SCHs, which are the codes of cell code groups to which cell #11, cell #23 and cell #32 belong.

When UE #2 succeeds in detecting the PSC 212 from cell #23 in the first cell search step, UE #2 detects SSC #n being the code of a cell code group applied to an S-SCH in cell #23 using the PSC 212 as a channel estimation pilot. In the same manner, when UE #1 succeeds in detecting any of the PSCs 210, 212 and 214 in the first cell search step, UE #1 detects the code of a cell code group applied to an S-SCH using the detected PSC.

Since UE #1 simultaneously receives the PSCs 210, 212 and 214 from the three cells 200, 201 and 202 due to the UE #1 location, UE #1 achieves a combined channel response with respect to the cells 200, 201 and 202 by channel estimation of the P-SCH. However, SSC #k, SSC #n and SSSC #m are specific to the respective cells 200, 201 and 202. Thus, the UE #1 cannot detect an intended SSC from the combined channel response.

That's why the EUTRA standard defines three PSCs for P-SCHs. As illustrated in FIG. 3, different PSCs are typically allocated to adjacent cells so a UE at a cell boundary can use a P-SCH as a channel estimation pilot for S-SCH detection even in a synchronous network. As a first UE 305 (UE #1) is located at the boundary among $13^{th}$, $11^{th}$ and $21^{th}$ cells 307, 309 and 310 (cell #13, cell #11 and cell #21), UE #1 receives different PSCs 302, 303 and 304 (PSC1, PSC3 and PSC2) from the cells 307, 309 and 310. By channel estimation based on any of the PSCs 302, 303 and 304, UE #1 can achieve a channel response specific to a cell. For instance, UE #1 achieves a unique channel response between cell #13 and UE #1 from PSC1 and uses PSC1 for channel compensation and detection of an S-SCH transmitted from cell #13. In the same manner, a second UE 306 (UE #2) receives different PSCs 308, 311 and 301 (PSC1, PSC3 and PSC2) from adjacent cells and processes them.

However, the use of a plurality of PSCs for an improved cell search performance in the synchronous network degrades cell search performance in an asynchronous network. Since frame transmission timings are asynchronous among cells in the asynchronous network, even though every cell transmits the same PSC, a UE has a very low probability of receiving the PSC from cells at the same timing. When the plurality of PSCs are nevertheless used for the asynchronous network, the UE should conduct a hypothesis test against the PSCs in the first cell search step. As a result, cell search complexity is increased and PSC detection performance is degraded, as compared to the case of using a single PSC.

SUMMARY OF THE INVENTION

The present invention substantially addresses at least the above-described problems and/or disadvantages and provides at least the advantages described below. Accordingly, an aspect of the present invention is to provide a method and apparatus for transmitting and receiving an SCH so as to offer an excellent performance and a decreased complexity for cell search in both synchronous and asynchronous networks in a wireless communication system.

Another aspect of the present invention is to provide a method and apparatus for transmitting and receiving an SCH without causing performance degradation and a complexity increase in an asynchronous network, despite use of a plurality of PSCs.

In accordance with an aspect of the present invention, there is provided a method for transmitting an SCH in a cellular wireless communication system, in which a number of available PSCs among PSCs defined for P-SCH in the system is checked, a default PSC being predetermined to be used with priority in UEs of the system for searching the P-SCH is selected and a P-SCH signal is transmitted with the default PSC in each of underlying cells when the number of available PSCs is 1, and PSCs are selected for the cells from among the available PSCs so adjacent cells have different PSCs and P-SCH signals are transmitted using the selected PSCs in the cells when the number of available PSCs is 2 or larger.

In accordance with another aspect of the present invention, there is provided an apparatus of a Node B for transmitting an SCH in a cellular wireless communication system, in which a PSC selector checks a number of available PSCs among PSCs defined for P-SCH in the system, selects a default PSC being predetermined to be used with priority in UEs of the system for search the P-SCH when the number of available PSCs is 1, and selects PSCs for the cells from among the available PSCs so adjacent cells have different PSCs when the number of available PSCs is 2 or larger, and a transmitter transmits a P-SCH signal generated with each of at least one selected PSC in each cell.

In accordance with a further aspect of the present invention, there is provided a method for receiving an SCH in a cellular wireless communication system, in which a P-SCH detection is attempted using a default PSC first, preset to be applied to all cells of the system, the P-SCH detection is attempted using remaining PSCs except the default PSC when the P-SCH detection based on the default PSC is failed, and an S-SCH is received using the detected P-SCH signal when the P-SCH detection based on the default PSC is successful.

In accordance with still another aspect of the present invention, there is provided an apparatus of UE for receiving an SCH in a cellular wireless communication system, in which a PSC selector selects a default PSC first, and sequentially selects remaining PSCs except the default PSC when the P-SCH detection based on the default PSC is failed, and a P-SCH detector attempts to detect a P-SCH signal using each PSC selected by the PSC selector from a received signal and outputs a P-SCH detection result to the PSC selector.

BRIEF DESCRIPTION OF THE DRAWINGS

The above and other aspects, features and advantages of certain preferred embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE PREFERRED EMBODIMENTS

The matters defined in the description are provided to assist in a comprehensive understanding of preferred embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

While preferred embodiments of the present invention are described in the context of the 3$^{rd}$ Generation Partnership Project (3GPP) Evolved Universal Terrestrial Radio Access (EUTRA) standard, those skilled in the art will clearly understand that the present invention is also applicable to other communication systems having a similar technological background and channel configuration with a slight modification made within the scope and spirit of the present invention.

The present invention achieves an excellent performance and a low complexity in cell search in both synchronous and asynchronous networks, despite use of a plurality of Primary Synchronization Channel Codes (PSCs) or P-SCH codes for downlink P-SCHs in a wireless communication system having the synchronous and asynchronous networks. As described before, a main shortcoming with the conventional technology using a plurality of PSCs is that an asynchronous network suffers from a degraded performance and an increased complexity in cell search because a User Equipment (UE) is not aware of PSCs used by a system. Even though the system uses one or some of available PSCs for P-SCHs, the UE does not distinguish the used PSCs from unused PSCs.

To solve this problem, the system preliminarily agrees with UEs on a PSC (referred to as a default PSC) by which the UEs perform cell search first of all in the present invention. When the system applies only one default PSC to all cells as in an asynchronous network, a Node B uses the default PSC in all of the underlying cells of the Node B and a UE initially performs a cell search using the PSC. If an UE searches neighbor cells after acquiring initial synchronization to a current cell, the Node B acquires PSC information indicating PSCs used in a current system connected to the UE from the current cell and performs a P-SCH detection operation over the PSCs only.

For understanding the present invention, the following examples will now be described.

Figure 1:
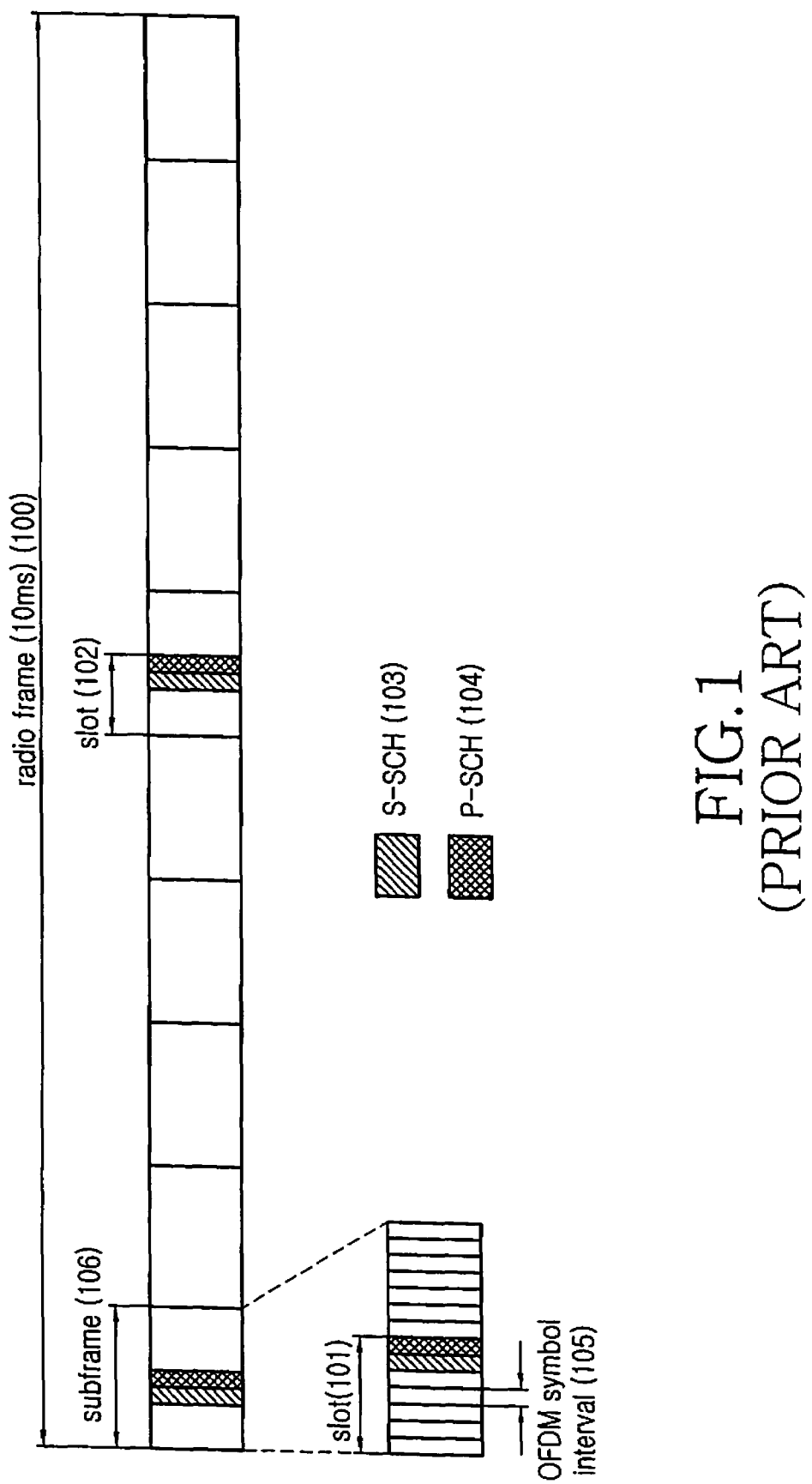
FIG. 1 is a view illustrating a known downlink frame structure and mapping of downlink SCHs.
Figure 2:
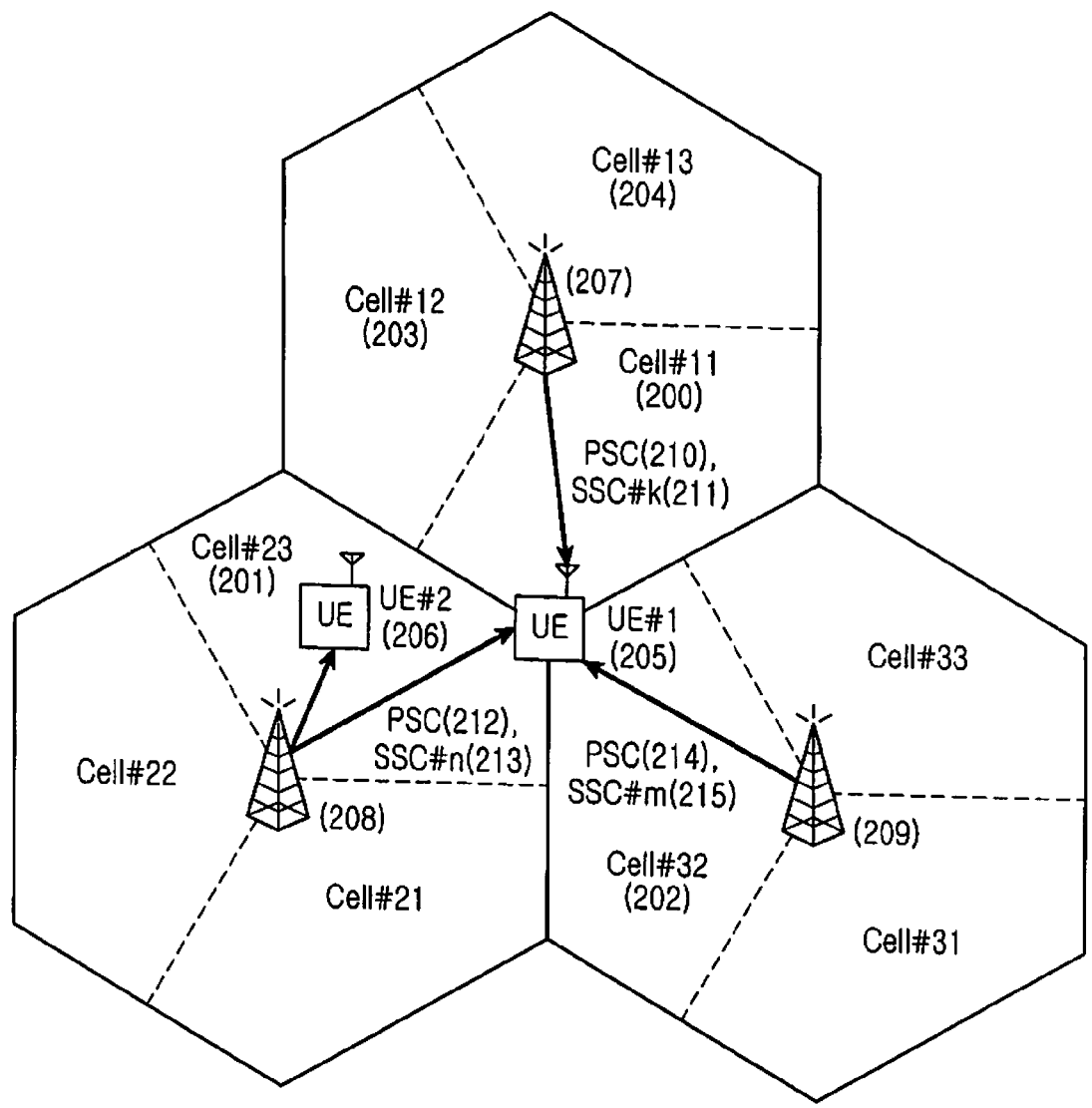
FIG. 2 illustrates a known case where a UE receives P-SCHs and S-SCHs from a plurality of cells.
Figure 3:
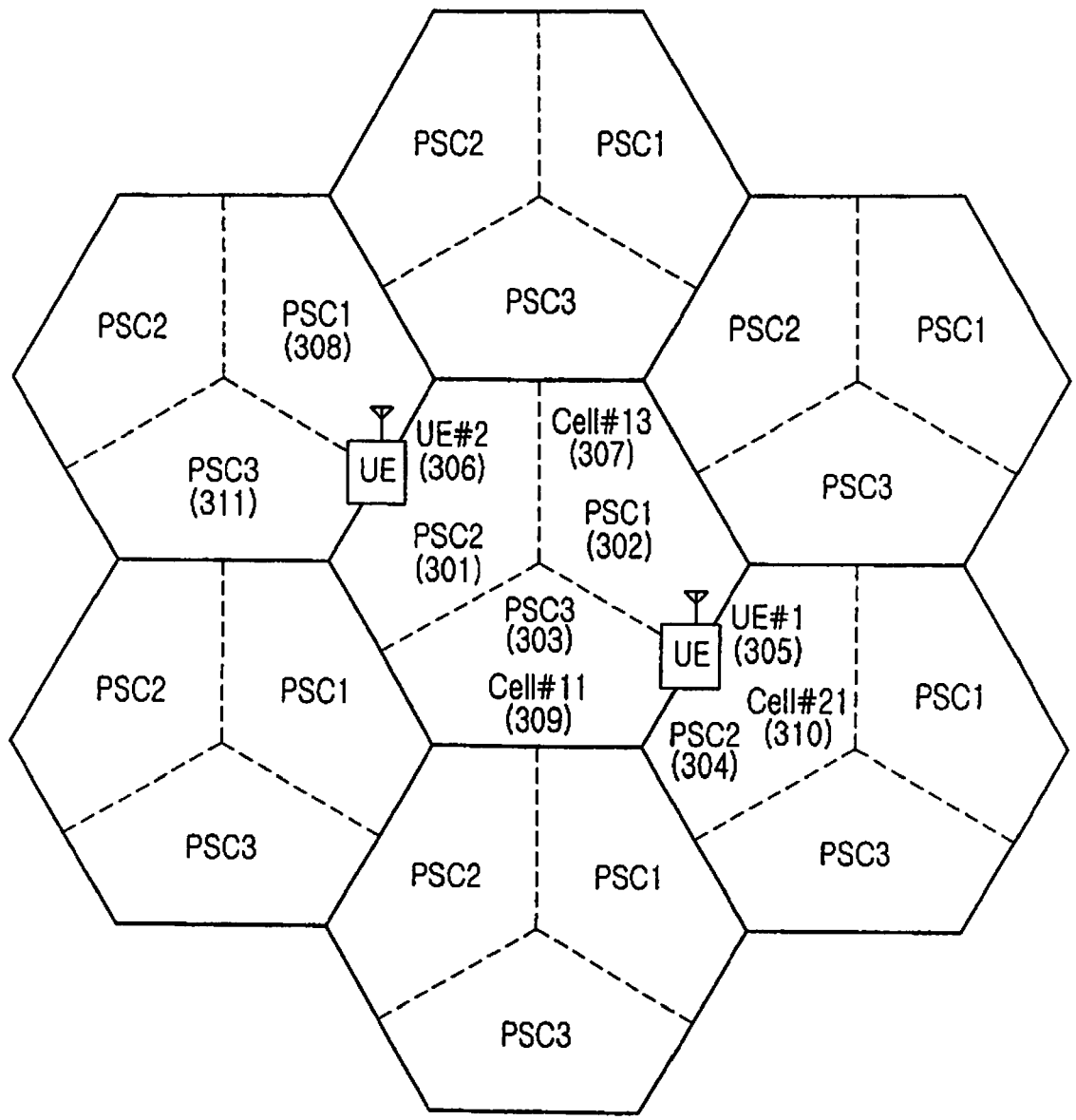
FIG. 3 is a view illustrating a known application of three different PSCs to adjacent cells.
Figure 4:
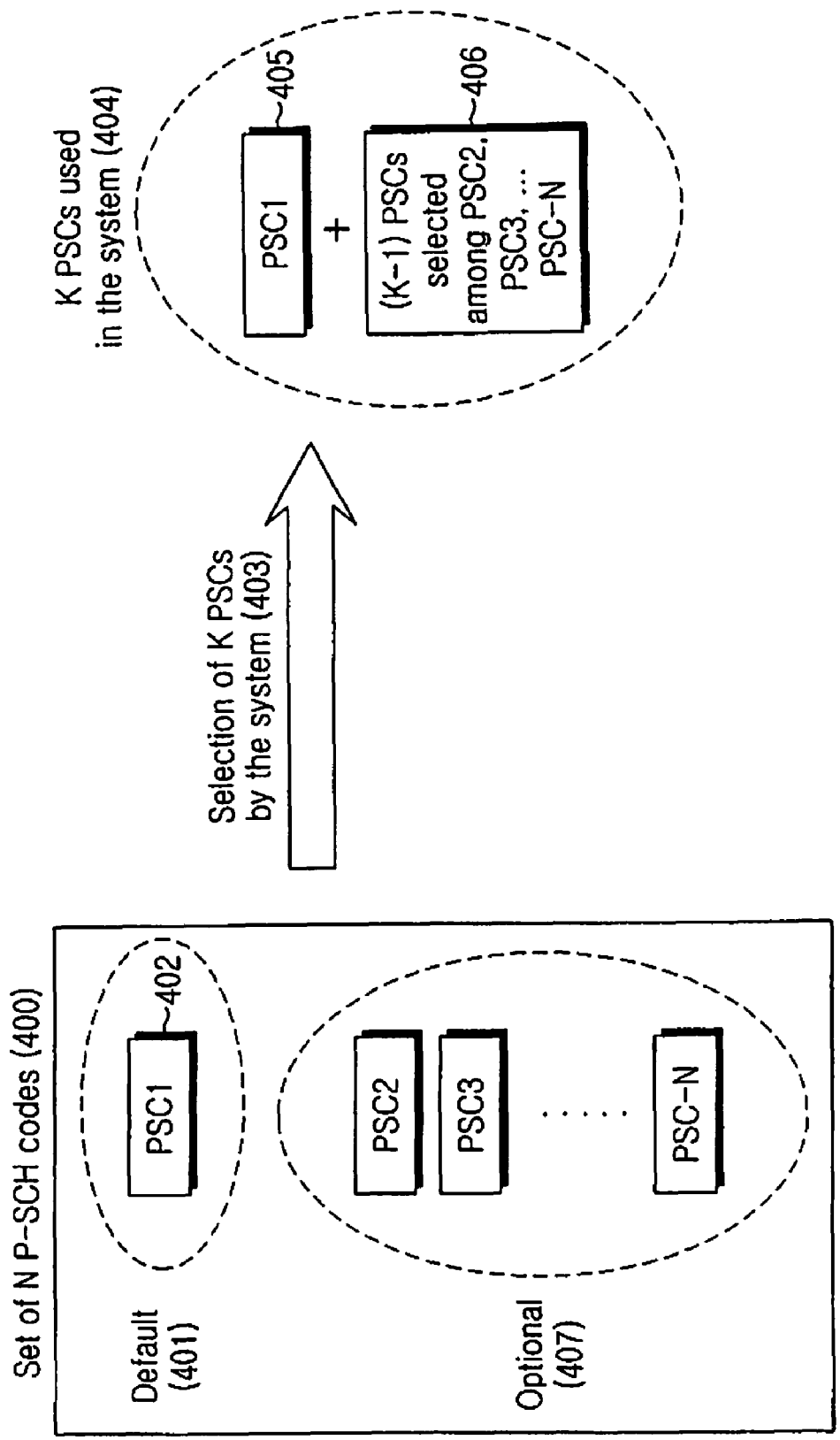
FIG. 4 illustrates PSC allocation according to a first embodiment of the present invention.

FIG. 4 illustrates PSC allocation according to a first example of the present invention in the case where a system uses a plurality of PSCs. In FIG. 4, a total of N PSCs are defined for P-SCHs in a cell code group 400. A description will be made of an operation for selecting K PSCs for use in the system from among the N PSCs.

Among the N PSCs, a particular PSC 402 (PSC1) is designated as a default PSC 401 that the system should always select. PSC1 is preset between UEs and the system. If only one PSC is used in every cell of the system, PSC1 is always applied to all cells. When the system selects K PSCs 404 for the cells within the system, as indicated by reference numeral 403, PSC1 is first selected as indicated by reference numeral 405 and the remaining (K−1) PSCs are selected from among the PSCs of an optional group 407 as indicated by reference numeral 406. Therefore, if K=1, only the default PSC 402 (i.e. PSC1) is selected for the system.

K varies with the system. If the system is asynchronous, one PSC is usually preferable. Yet, preferred PSCs and the number of the preferred PSCs may vary depending on network design of the system. However, in the present invention, one default PSC may be preset for selection in any case. By setting a particular PSC as a default PSC, cell search can be performed with an improved performance and a decreased complexity even though a UE is not aware of the used PSC during an initial access to the system. That is, when a single PSC only is used as in an asynchronous system, a Node B transmits a P-SCH signal using PSC1 to every cell and the UE also detects the P-SCH signal by using only PSC1. Hence, the cell search is simplified.

Figure 5:
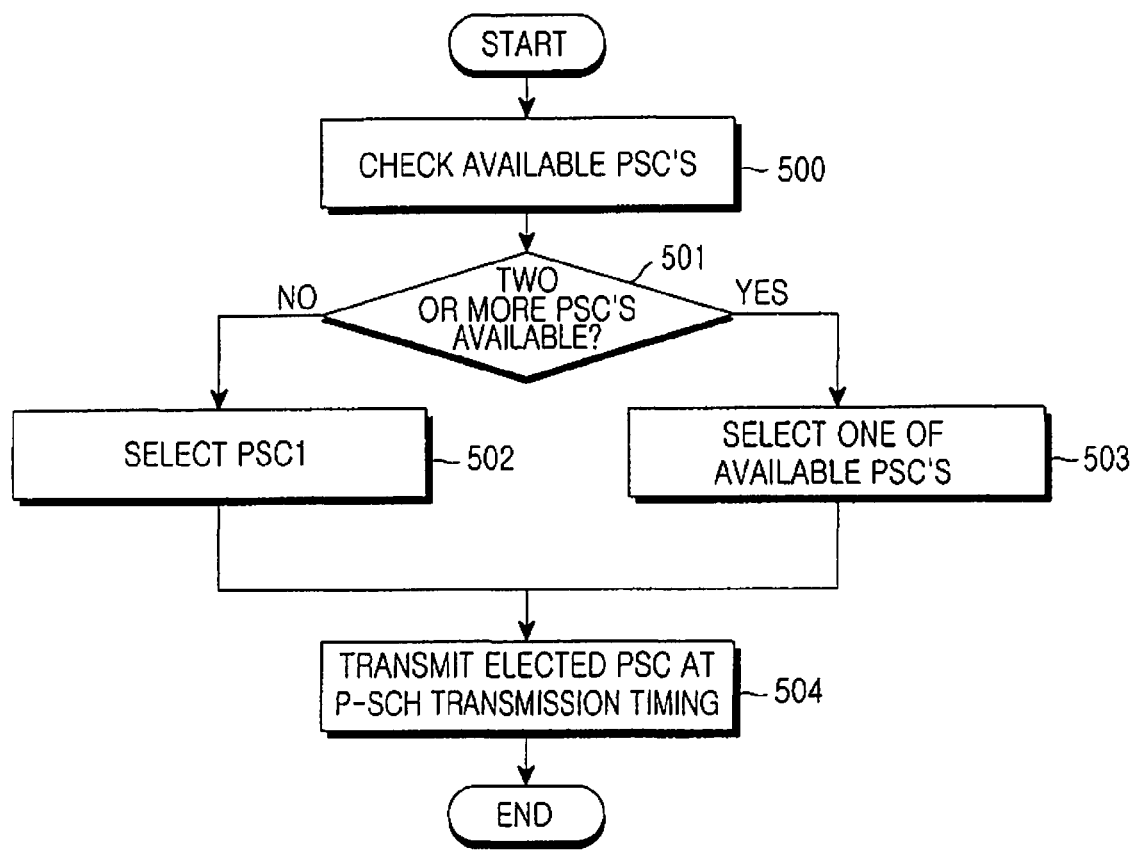
FIG. 5 is a flowchart of a PSC transmission operation in a Node B according to the first embodiment of the present invention.

FIG. 5 is a flowchart of a PSC transmission operation in the Node B according to the first example of the present invention.

Referring to FIG. 5, the Node B checks the number of PSCs available to the system to which the Node B belongs in step 500 and determines whether the number of available PSCs is equal to or larger than 2 in step 501. The available PSCs are the K PSCs 404 in FIG. 4, always including the default PSC, PSC1. For example, if the Node B is in an asynchronous network and thus frame transmission timing is not synchronous among cells, the Node B determines that only one PSC is available. Besides, the number of available PSCs can be determined according to cell design.

If K is equal to 1, the Node B selects PSC1 preset as a default PSC of the system for the underlying cells of the Node B and transmits a P-SCH signal to which PSC1 is applied to UEs within the cells at a P-SCH transmission timing (i.e. in an Orthogonal Frequency Division Multiplexing (OFDM) symbol interval of each slot) in step 502. If K is equal to 2 or larger, the Node B selects one of the available PSCs for each underlying cell, taking into account interference between P-SCHs from neighbor cells and transmits a P-SCH signal to which the selected PSC is applied to UEs in the cell at a P-SCH transmission timing in step 503.

Figure 6:
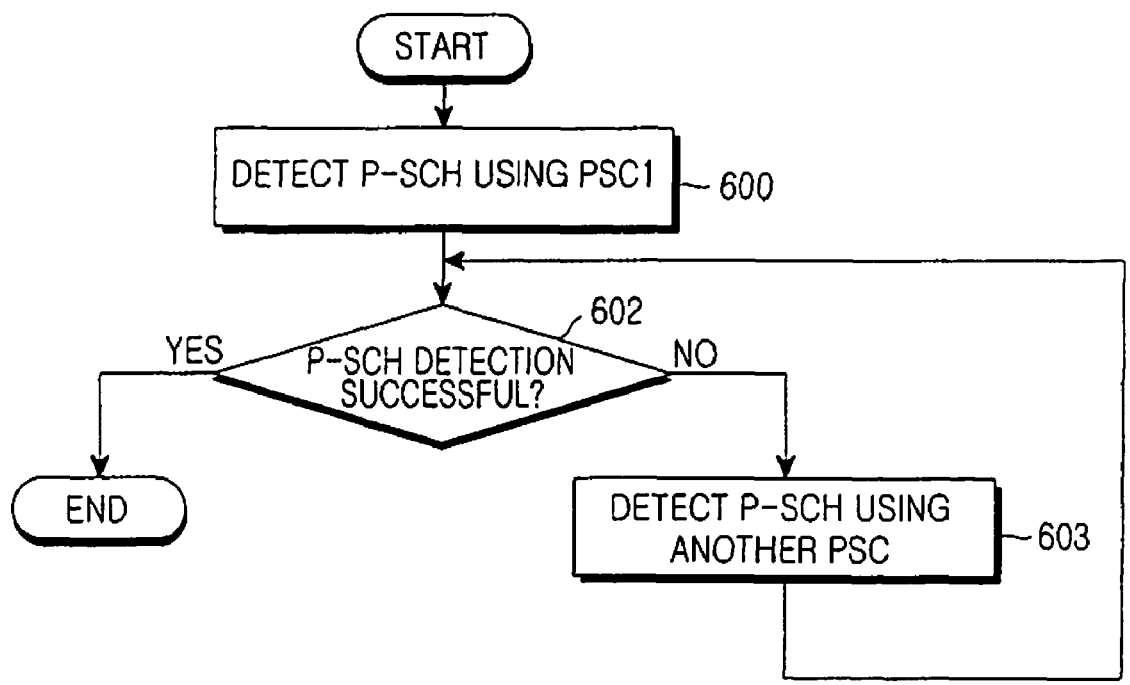
FIG. 6 is a flowchart of a PSC detection operation in a UE according to the first embodiment of the present invention.

FIG. 6 is a flowchart of a PSC detection operation in a UE according to the first example of the present invention.

Referring to FIG. 6, the UE detects a P-SCH using the particular default PSC of the system, PSC1 in step 600 and determines whether the P-SCH detection is successful in step 602. While the UE has no knowledge of the number of PSCs used in the system during an initial access to the system, PSC1 is used not only in the case where only one PSC applies to every cell, but also in the case where a plurality of PSCs apply to each cell. If the P-SCH has been successfully detected using PSC1, the UE ends the P-SCH detection. The detection result of the P-SCH is used for S-SCH reception.

On the other hand, if the system uses a plurality of PSCs and a current cell to which the UE belongs uses a PSC different from PSC1, the UE fails in detecting the P-SCH in step 602. Then the UE attempts to detect the P-SCH using another PSC in step 603 and returns to step 602. If the P-SCH detection is successful, the UE ends the P-SCH detection. Otherwise, the UE proceeds to step 603 to continue P-SCH detection using other PSCs.

On the initial system access, the UE has no information about PSCs used in the system. In the worst case, the UE attempts cell search over every one of the N PSCs 400 illustrated in FIG. 4.

The above UE operation improves performance and decreases complexity in the cell search of the UE, especially in a system using only one PSC for all cells like an asynchronous system. The same performance improvement is brought to a system using a plurality of PSCs, because a default PSC is always included in P-SCH signals from all cells and thus the UE performs cell search with respect to the default PSC first of all. Meanwhile, even though the UE does not know whether the connected system is synchronous or asynchronous, the UE can use a P-SCH with the default PSC as a channel estimation pilot for S-SCH detection. Because cells are asynchronous with one another in an asynchronous system and adjacent cells use different PSCs in a synchronous system, the acquired P-SCH can be used as a channel estimation pilot for a cell that transmits an associated S-SCH signal.

Figure 7:
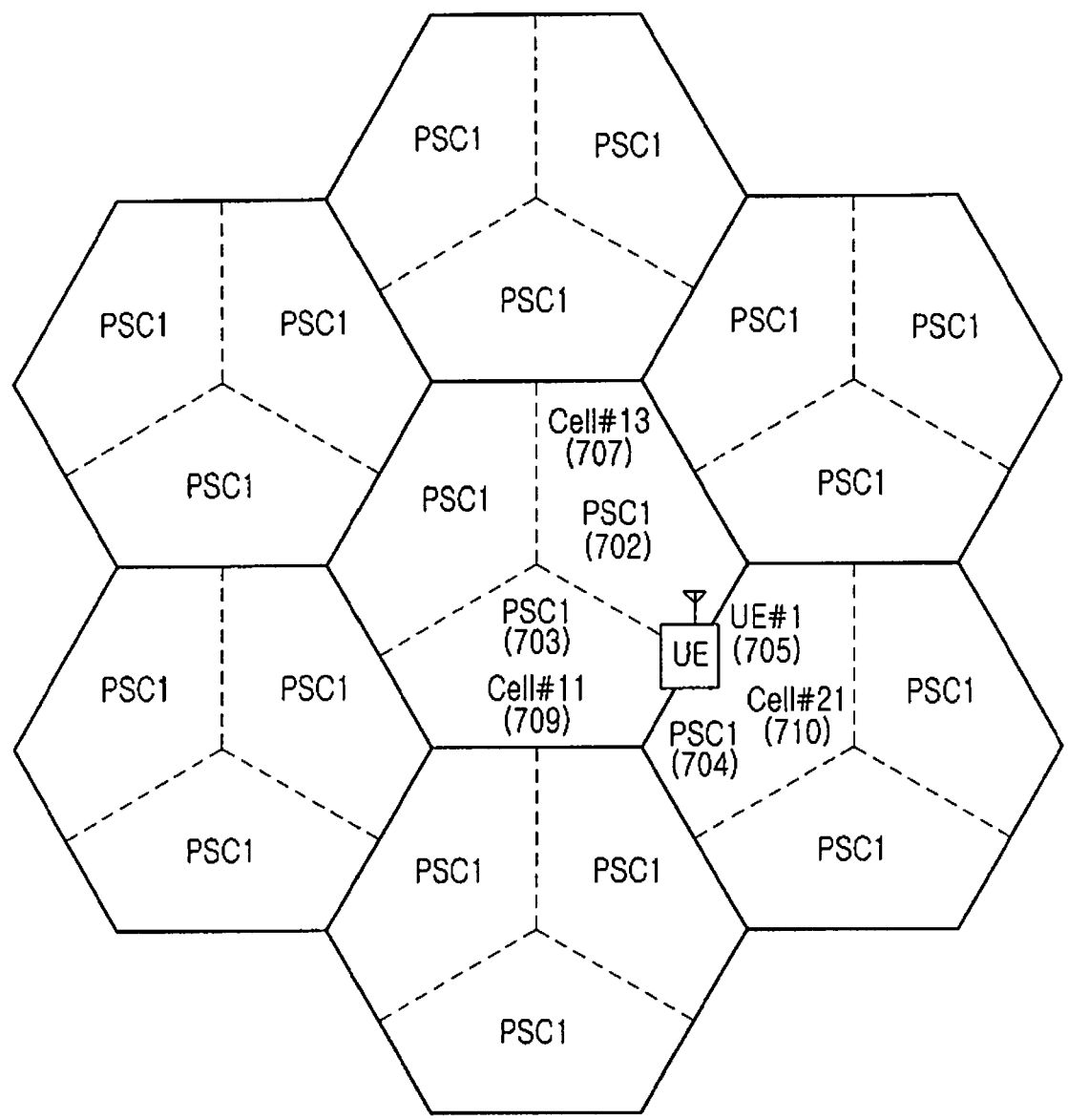
FIG. 7 illustrates a case where all cells use only a default PSC according to the first embodiment of the present invention.

FIG. 7 illustrates a case where all cells use only a default PSC according to the first example of the present invention.

Referring to FIG. 7, only a default PSC, PSC1 is used in every cell. Thus, a first UE 705 (UE #1) at the boundary among $13^{th}$, $11^{th}$ and $21^{th}$ cells 707, 709 and 710 (cell #13, cell #11 and cell #21) first attempts to detect a P-SCH using PSC1 as in the procedure of FIG. 6. Thus, UE #1 can fast detect at least one of PSCs 702, 703 and 704 transmitted from cell #13, cell #11 and cell #21.

Figure 8:
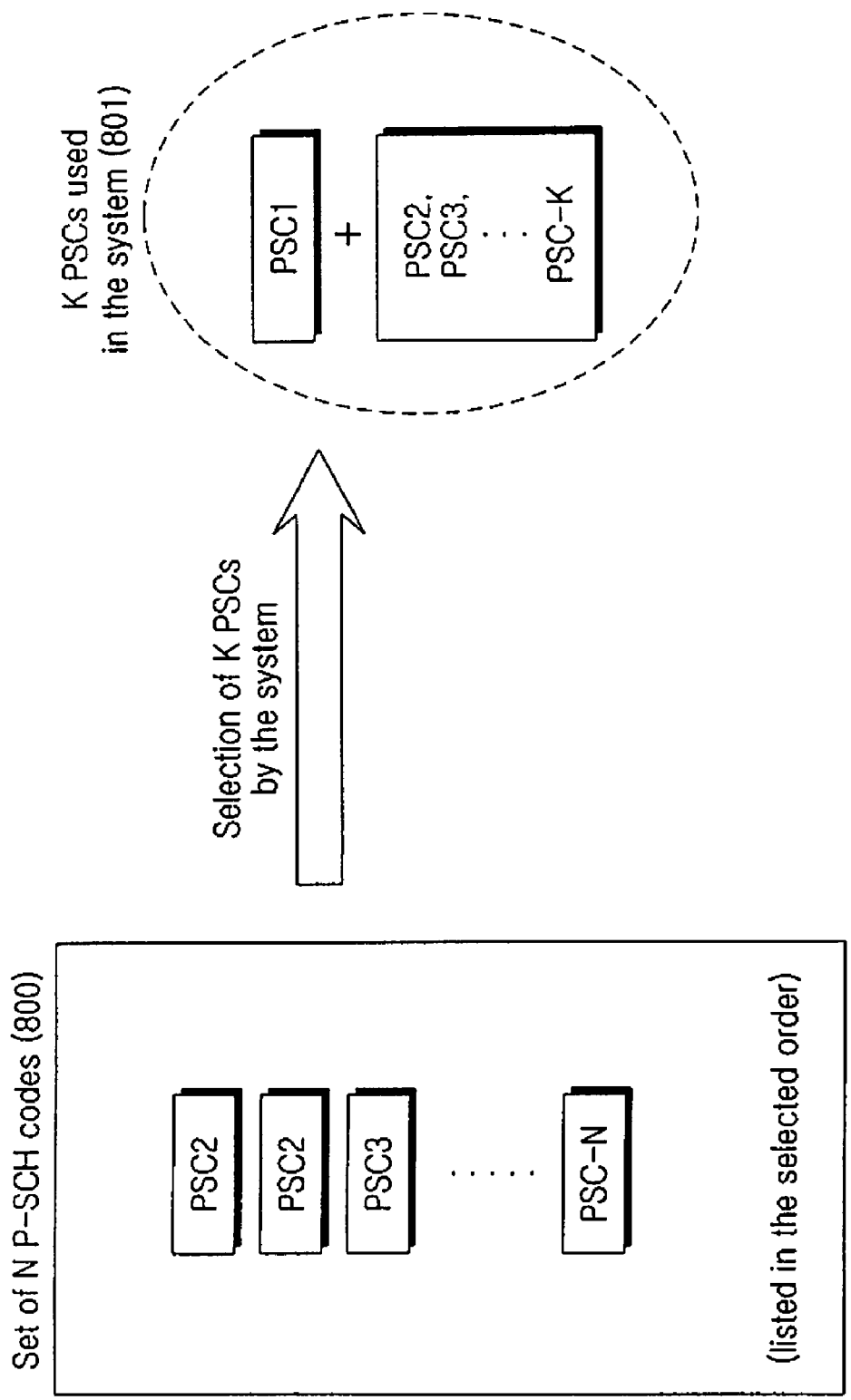
FIG. 8 illustrates PSC allocation according to a second embodiment of the present invention.

FIG. 8 illustrates PSC allocation according to a second example of the present invention. The PSC allocation differs from the PSC allocation illustrated in FIG. 4 in that when K PSCs are selected from among N available PSCs 800, a PSC selection rule is preset.

Referring to FIG. 8, when K PSCs 801 are used from among the N PSCs 800 defined in a system, PSC1 to PSC-K are selected in the ascending order of PSC indexes. The present invention does not limit the PSC selection to selecting K PSCs in the order of PSC indexes. Rather, it suffices that the order of selecting PSCs is set in the present invention. In the second example of the present invention, the PSCs are described as being selected in the ascending order of PSC indexes, for example. The rule of selecting PSCs according to K is defined in the standard or preset between the Node B and the UE.

The Node B performs a PSC transmission operation in a similar manner to that illustrated in FIG. 5 and thus the PSC transmission operation description will not be provided.

Figure 9:
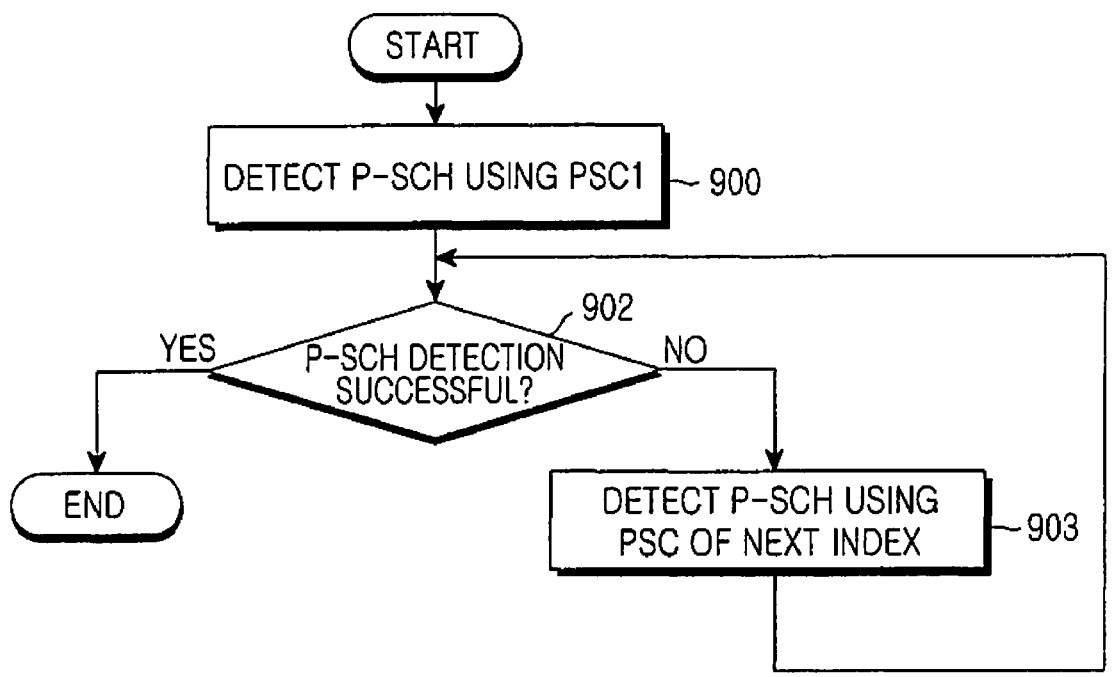
FIG. 9 is a flowchart of a PSC detection operation in the UE according to the second embodiment of the present invention.

FIG. 9 shows a PSC detection operation in the UE according to the second example of the present invention.

Referring to FIG. 9, the UE detects a P-SCH using the particular default PSC of the system, PSC1 in step 900 and determines whether the P-SCH detection is successful in step 902, because PSC1 is used in every system. If the P-SCH detection is failed, the UE attempts to detect the P-SCH using the PSC with the next index among all PSCs defined for a system in step 903 and returns to step 902.

Step 903 is performed sequentially in the order of the indexes of the PSCs 800 illustrated in FIG. 8 until the UE succeeds in detecting the P-SCH because without knowledge of the number of PSCs used for cell search in the system, there is a higher probability that the system uses a lower-index PSC. Even for a system using all of the N PSCs, each PSC has the same probability that a cell where the UE is located uses the PSC and thus the above operation is viable.

Now a description will be made of signaling and device structures that are applicable to both the PSC allocations illustrated in FIGS. 4 and 8.

Figure 10:
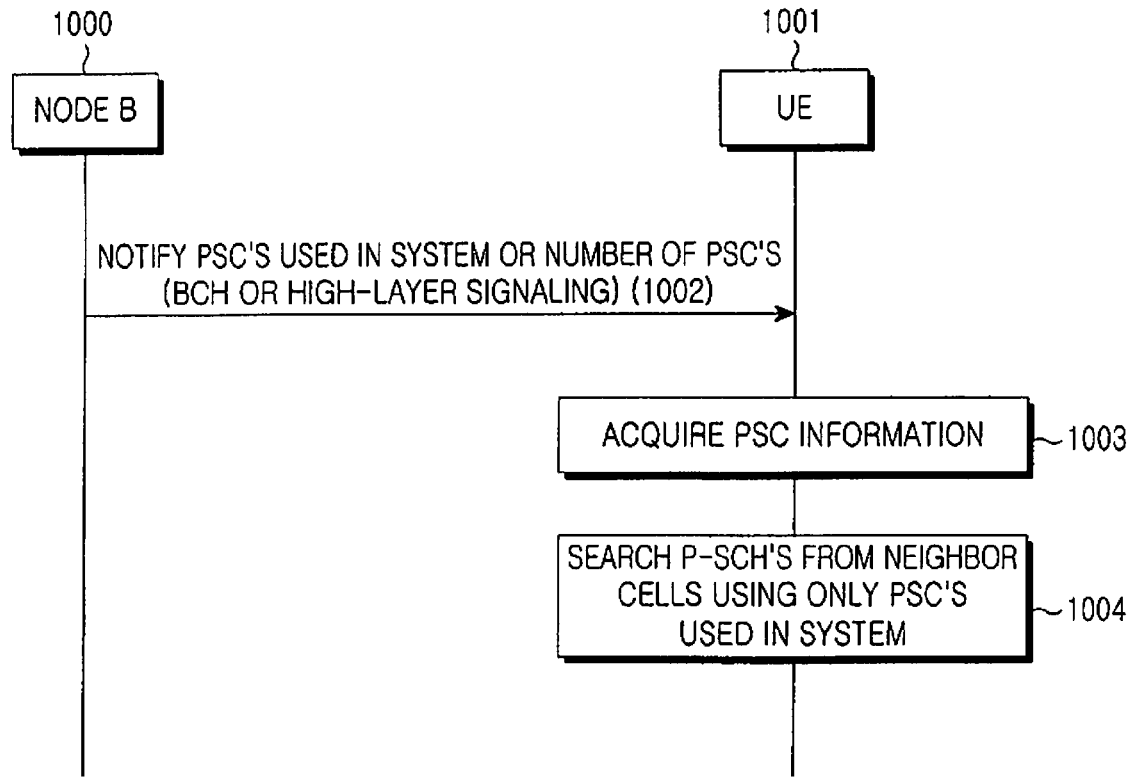
FIG. 10 illustrates a procedure for transmitting and receiving PSC information and detecting a PSC between the Node B and the UE according to the present invention.

FIG. 10 illustrates a procedure for transmitting and receiving PSC information and detecting a PSC between the Node B and the UE to improve cell search performance according to of the present invention, when the UE searches neighbor cells in active mode after an initial cell search, or in idle mode in a system using K PSCs selected from among N available PSCs for P-SCHs.

Referring to FIG. 10, each Node B 1000 in the system transmits PSC information representing PSCs used in the system or the number of the PSCs on a BCH or by high-layer signaling in step 1002. While the PSCs are explicitly indicated in the first example of the present invention, only the number of PSCs used in the system can be notified when the rule of selecting PSCs is determined according to the number of PSCs used in the system, K as in the second example of the present invention.

In step 1003, a UE 1001 acquires the PSC information on the BCH or by the high-layer signaling. During cell search, the UE detects a P-SCH using only the PSCs used in the system, indicated by the PSC information in step 1003. Thus, when the UE that has succeeded in the cell search searches neighbor cells, cell search performance is increased and cell search complexity is decreased.

Figure 11:
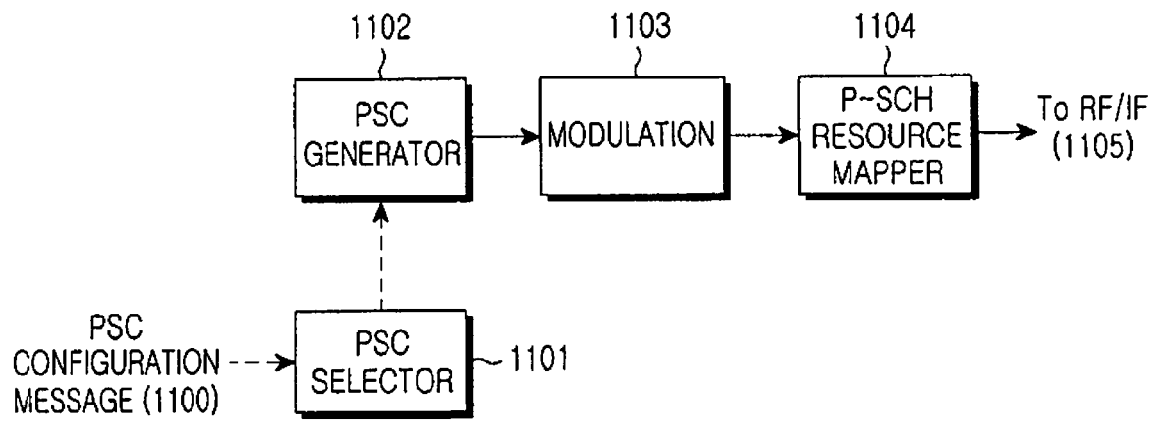
FIG. 11 is a block diagram of a Node B transmitter according to the present invention.

FIG. 11 shows a Node B transmitter according to the present invention.

Referring to FIG. 11, a PSC selector 1101 receives a PSC configuration message 1100 indicating PSCs for use in P-SCH generation from a system (e.g. a anchor node or a system manager), selects at least one PSC index for a cell according to the PSC configuration message, and provides the at least one PSC index to a PSC generator 1102. In general, the PSC index indicates a default PSC in an asynchronous system, whereas the PSC index indicates at least one PSC different from a PSC applied to a neighbor cell in a group of available PSCs including the default PSC in a synchronous system.

The PSC generator 1102 generates PSC samples for each PSC according to the at least one PSC index. A modulator 1103 modulates the PSC samples, thus producing PSC modulation samples. A PSC resource mapper 1104 maps the PSC modulation symbols to P-SCH transmission resources. For example, the transmission resources are a Walsh code in a Wideband Code Division Multiple Access (WCDMA) system, while transmission resources are at least one subcarrier in an OFDM system. The resource-mapped P-SCH signal is converted to an analog signal in a Radio Frequency (RF)/Intermediate Frequency (IF) module (not shown) and transmitted to UEs within the cell.

While not shown, the Node B transmitter may further include a BCH/high-layer transmitter for transmitting PSC information indicating the PSCs used in the system or the number of the PSCs on a BCH or by high-layer signaling when the Node B transmitter signals in the manner illustrated in FIG. 10.

Figure 12:
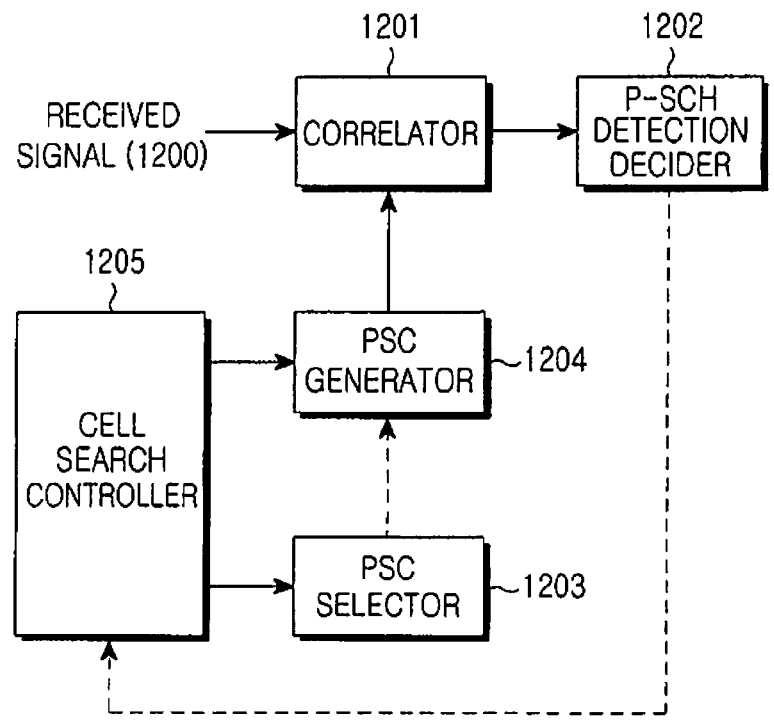
FIG. 12 is a block diagram of a UE receiver according to the present invention.

FIG. 12 shows a UE receiver according to the present invention.

Referring to FIG. 12, a cell search controller 1205 operates a PSC generator 1204 and a PSC selector 1203 for P-SCH detection. The PSC selector 1203 selects one of N available PSCs according to a command from the cell search controller 1205 and provides the index of the selected PSC to the PSC generator 1204. The cell search controller 1205 selects a default PSC first of all from the N PSCs. When a P-SCH signal is not detected by use of the default PSC, the cell search controller 1205 sequentially selects the remaining PSCs in a particular selection rule.

The PSC generator 1204 generates the PSC corresponding to the PSC index and a correlator 1201 correlates a received signal 1200 with the PSC received from the PSC generator 1204. A P-SCH detection decider 1202 determines from the correlation received from the correlator 1201 whether the P-SCH has been detected and notifies the cell search controller 1205 of the determination result. To be more specific, if the correlation exceeds a particular threshold, the P-SCH detection decider 1202 determines that the P-SCH has been detected. With respect to the default PSC, the blocks 1201, 1202, 1203 and 1204 operate. When the P-SCH detection using the default PSC is failed, the PSC selector 1203 selects other PSCs sequentially under the control of the cell search controller 1205. For the other PSCs, the blocks 1201, 1202, and 1204 operate.

While not shown, if the Node B transmitter signals in the manner illustrated in FIG. 10, the UE receiver further includes a Broadcast CHannel (BCH)/high-layer receiver for receiving PSC information indicating the PSCs used in the system or the number of the PSCs on a BCH or by high-layer signaling.

As is apparent from the above description, the present invention advantageously improves the performance of P-SCH detection without increasing the complexity of UEs because a default PSC is basically used for all cells of a system.

While the invention has been shown and described with reference to certain preferred embodiments of the present invention thereof, it will be understood by those skilled in the art that various changes in form and details may be made therein without departing from the spirit and scope of the present invention as defined by the appended claims and their equivalents.

What is claimed is:

1. A method for transmitting a Synchronization CHannel (SCH) in a cellular wireless communication system, the method comprising:
    checking a number of available Primary SCH Scrambling Codes (PSCs) among PSCs defined for Primary SCH (P-SCH) in the system;

selecting a default PSC and transmitting a P-SCH signal using the default PSC in each of underlying cells when the number of available PSCs is 1, the default PSC being preset with priority for use in User Equipments (UEs) of the system for searching the P-SCH; and selecting PSCs for the cells from among the available PSCs so adjacent cells have different PSCs and transmitting P-SCH signals with the selected PSCs in the cells when the number of available PSCs is 2 or larger.

2. The method of claim 1, further comprising acquiring the number of available PSCs from a PSC configuration message received from the system.

3. The method of claim 1, wherein the available PSCs are selected from the PSCs defined in the system according to a particular rule.

4. The method of claim 1, wherein the default PSC is a PSC having the lowest index among the PSCs defined in the system.

5. The method of claim 4, wherein when the number of available PSCs is 2 or larger, the available PSCs are selected in an ascending order of indexes of the PSCs defined in the system.

6. The method of claim 1, further comprising transmitting PSC information explicitly indicating the available PSCs or indicating the number of the available PSCs to UEs of the each cell on a Broadcast CHannel (BCH) or by high-layer signaling.

7. An apparatus of a Node B for transmitting a Synchronization CHannel (SCH) in a cellular wireless communication system, the apparatus comprising:

a Primary SCH Scrambling Code (PSC) selector for checking a number of available PSCs among PSCs defined for Primary SCH (P-SCH) in the system, selecting a default PSC when the number of available PSCs is 1, the default PSC being preset with priority for use in User Equipments (UEs) of the system for searching the P-SCH, and selecting PSCs for cells from among the available PSCs so adjacent cells have different PSCs when the number of available PSCs is 2 or larger; and a transmitter for transmitting a P-SCH signal generated with each of at least one selected PSC in each cell.

8. The apparatus of claim 7, wherein the PSC selector acquires the number of available PSCs from a PSC configuration message received from the system.

9. The apparatus of claim 7, wherein the available PSCs are selected from the PSCs defined in the system according to a particular rule.

10. The apparatus of claim 7, wherein the default PSC is a PSC having the lowest index among the PSCs defined in the system.

11. The apparatus of claim 10, wherein if the number of available PSCs is 2 or larger, the available PSCs are selected in an ascending order of indexes of the PSCs defined in the system.

12. The apparatus of claim 7, wherein the transmitter transmits PSC information explicitly indicating the available PSCs or indicating the number of the available PSCs to UEs of the each cell on a Broadcast CHannel (BCH) or by high-layer signaling.

13. A method for receiving a Synchronization CHannel (SCH) in a cellular wireless communication system, the method comprising:

attempting to detect a Primary SCH (P-SCH) signal, using a default P-SCH Scrambling Code (PSC) first, the default PSC being preset with priority for use in User Equipments (UEs) of the system for searching a P-SCH when a number of available PSCs among PSCs defined for the P-SCH in the system is one;

attempting to detect the P-SCH signal using remaining PSCs except the default PSC when the P-SCH detection based on the default PSC is failed; and receiving a Secondary SCH (S-SCH) using the detected P-SCH signal when the P-SCH detection based on the default PSC is successful.

14. The method of claim 13, wherein the available PSCs are selected from the PSCs defined in the system according to a particular rule.

15. The method of claim 13, wherein the default PSC is a PSC having the lowest index among the PSCs defined in the system.

16. The method of claim 15, wherein the detection attempt in case of failed P-SCH detection based on the default PSC comprises attempting to detect the P-SCH signal using the PSCs defined in the system in an ascending order of PSC indexes.

17. The method of claim 13, further comprising receiving PSC information explicitly indicating the available PSCs or indicating the number of the available PSCs to UEs of each cell on a Broadcast CHannel (BCH) or by high-layer signaling.

18. An apparatus of User Equipment (UE) for receiving a Synchronization CHannel (SCH) in a cellular wireless communication system, the apparatus comprising:

a Primary SCH Scrambling Code (PSC) selector for selecting a default PSC first, the default PSC being preset with priority for use in User Equipments (UEs) of the system for searching a P-SCH when a number of available PSCs among PSCs defined for the P-SCH in the system is one, and sequentially selecting remaining PSCs except the default PSC when the P-SCH detection based on the default PSC is failed; and a P-SCH detector for attempting to detect a P-SCH signal using each PSC selected by the PSC selector from a received signal and outputting a P-SCH detection result to the PSC selector.

19. The apparatus of claim 18, wherein the available PSCs are selected from the PSCs defined in the system according to a particular rule.

20. The apparatus of claim 18, wherein the default PSC is a PSC having the lowest index among the PSCs defined in the system.

21. The apparatus of claim 20, wherein the PSC selector selects the PSCs defined in the system in an ascending order of PSC indexes and provides the selected PSCs to the P-SCH detector when the P-SCH detection based on the default PSC is failed.

22. The apparatus of claim 18, further comprising a receiver for receiving PSC information explicitly indicating the available PSCs or indicating the number of the available PSCs to UEs of each cell on a Broadcast CHannel (BCH) or by high-layer signaling.

* * * * *